Sept. 20, 1960     B. E. GORDON     2,953,146
PIPELINE TRANSPORTATION
Filed Aug. 19, 1957
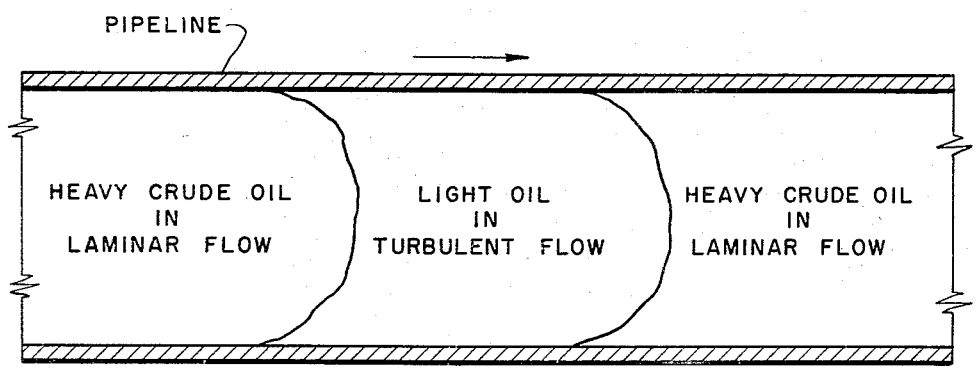
INVENTOR:
   BENJAMIN E. GORDON
BY: *James Todorovic*
   /HIS ATTORNEY

United States Patent Office 2,953,146
Patented Sept. 20, 1960

2,953,146

PIPELINE TRANSPORTATION

Benjamin E. Gordon, Concord, Calif., assignor to Shell Oil Company, New York, N.Y., a corporation of Delaware Filed Aug. 19, 1957, Ser. No. 679,110

8 Claims. (Cl. 137—1)

The present invention relates to the operation of pipelines employed for the transportation of fluid substances, and in particular pertains to a method for separating and minimizing the intermingling of two different fluids which are being transported through the same pipeline one after the other, at least one of which fluids is viscous.

At present, it is the general practice in operating pipelines to pump large volumes (which are called "batches," "slugs" or "tenders") of different fluids successively and in the same direction through a given pipeline. Each of these slugs or tenders may range in volume from several hundred barrels to more than a hundred thousand barrels, and may be transported many miles (and even many hundreds of miles) from the source, where these tenders are introduced into a pipeline, to the terminal, e.g. the refinery where these crudes are processed to produce the various desired products, such as gasoline, kerosene, lubricating oils, etc. Generally, the flow of these crude petroleum oils, particularly of the relatively more viscous ones, through the pipelines is of a stream-line or laminar character, i.e. one in which the liquid is "telescoping" through the tube, so that each layer moves a shade faster than the one adjacent to it and nearer the wall of the tube, the fastest motion being at the center of the pipe, and the slowest movement of the liquid being in the immediate proximity of the wall. As a rule, the Reynolds numbers of these viscous crude oils flowing through pipeplines range in the neighborhood of from about 800 to about 2000. However, in some cases, particularly during warmer periods of the year, these viscous fluids may be flowing at least through portions of the pipeline in the so-called transition zone, namely, at Reynolds numbers of as high as 4000 or even 6000.

Various methods and means have been and still are used to determine the boundary between, for instance, a body of oil of one grade and a body of oil of another grade flowing through a pipeline. Thus, solid foreign bodies are introduced at the boundary, and their passage at or through a given point in the pipe noted by various techniques. Another method of determining rather successfully the boundary or interface between two contiguously flowing sequential quantities of different liquids involves the use of small amounts of radioactive materials. In this method a radioactive tracer material is introduced into the pipeline at the interface between two substances, e.g. between two different crude oil stocks, which have been placed into the pipeline in sequential adjacent relationship. The tracer material to be used is preferably one which will have the proper characteristics to intermingle readily with the substances in the pipeline and which will be carried at the interface and be distributed throughout the region thereof as the interface merges into the adjacent substances, in varying degrees in accordance with the manner in which the adjacent substances intermix due to conditions of flow or other peculiarities of pipeline operation. Obviously appropriate instruments have to be provided for detecting the radioactivity of the tracer material and for measuring the intensity and amount thereof, this to determine as accurately as possible the approach and passage of the interface between the two sequentially and adjacently moving batches or tenders of fluids, e.g. two different crude oils.

Although the use of the above-outlined methods permits the determination of the passage of the interface across any point in the pipeline, one of the biggest troubles which occur in the laminar flow of two different fluids through pipelines is their gradual intermixing at the interface. This is particularly true in the cases where one or both of the fluids are viscous; such viscous fluids, when in a state of stream-line or laminar flow, leave very long tails trailing along and in the immediate proximity of the pipe wall. These dragging tails become intermixed with the second fluid (e.g. another crude oil) being pumped immediately behind the former, this mixing becoming progressively larger as the two contiguously moving viscous liquids are pumped over several hundred miles. In fact, over such long distances, and particularly when the liquids have passed through several pumping stations, the two liquids, at the original interface, may have frequently commingled to such an extent that several hundred or even thousand barrels of the mixture may have to be separately withdrawn from the area of the interface before one can be assured that the two originally contiguous liquids are each free from any admixture with the other. If one of the two such liquids is of a relatively greater value, such intermixing clearly lowers the value of the mixture. This is true where, for instance, one of the two crudes being thus transported is a relatively valuable crude oil suitable for the production of high yields of lubricating oils, while the second crude is a relatively less valuable one suitable for the production of a feed stock to cracking units.

It is accordingly a broad object of the present invention to minimize or even inhibit the commingling of two contiguously moving viscous fluids. Another object is to inhibit the dilution of a relatively more valuable viscous crude oil in a relatively less valuable crude oil when both of these crude oils are being transported under conditions of substantially laminar flow sequentially and contiguous to each other. The term "substantially laminar flow" as used herein covers not only the truly laminar flows (at Reynolds numbers of from about 800 to about 2000), but also the lower transition zone, such as the flows where the Reynolds numbers are in the neighborhood of 4000 or even 6000. Other objects will be obvious, or will become apparent, as the description proceeds.

To accomplish these and other objects, the invention comprises the use of a slug or tender of a fluid which is miscible with both viscous fluids and which has such a low viscosity that, when transported as a tender between the two viscous fluids, its flow is distinctly and truly turbulent, i.e. Reynolds numbers clearly above 4000, and in most cases, above 10,000. More specifically stated, the invention resides in introducing between the two viscous liquids, e.g. between two different viscous crude oils to be pumped through a pipeline, a buffer or slug of a relatively low viscosity hydrocarbon fraction, the viscosity of said fraction being such that under the flow conditions in the pipeline this hydrocarbon fraction will be travelling under cleearly turbulent flow condition or state. Without being limited to any theory of the case, it is presently believed that the low viscosity oil flowing in turbulent state behind a viscous oil will wash the walls of the pipe, thus preventing or at least inhibiting any commingling of the viscous crude oil with any viscous crude oil which is transported behind the slug of the low viscosity oil. The invention will now be more fully described hereinbelow, reference being also made to the enclosed drawing which shows two heavy crude oil tenders flowing in laminar flow through a pipe, these tenders being separated by a slug of a light oil fraction which is travelling under turbulent flow conditions.

The nature of the buffer having a relatively low viscosity and which is to be introduced between two fluids, e.g. crude oils, having a relatively high viscosity, may vary within relatively wide limits, provided said buffer agent has such a viscosity that at the velocities and temperatures used in the pipeline employed for the transport of the viscous oils said buffer is traveling in a clearly turbulent state while the viscous oils flow is laminar. In the case of a buffer to be used for introduction between two viscous crude oils this buffer may be a relatively light liquid hydrocarbon, such as kerosene, which latter has a viscosity of between about 1.4 and about 2.2 centistokes at 100° F. However, hydrocarbon fractions having somewhat higher or lower viscosities may also be used, the viscosity of this buffer in part depending on the nature and character of the viscous hydrocarbons, e.g. crude oils being transported through the pipeline, it being noted that the main criterion in the selection of a hydrocarbon to be used as such buffer is that the hydrocarbon has such a viscosity that, at the velocities and temperatures used in the pipeline, this hydrocarbon buffer travels in a truly turbulent state, while the flow of the two viscous oils is of a more stream-line or laminar character. As an example, the buffer hydrocarbon may have a viscosity of 3.0 centistokes at 120° F., and an API gravity of 36°. The buffer may have the viscosity of a spray oil or even of a light mineral oil, while in some cases hydrocarbons below kerosene in viscosity may be used. As previously mentioned the Reynolds numbers of this light hydrocarbon buffer should be in most cases about 10,000, and preferably as high as 50,000 to 70,000 or even higher.

The amount of the relatively low viscosity buffer to be disposed between two tenders of viscous oils being transported may also vary within relatively wide limits, and will, at least in part, depend on the diameter of the pipe, the length thereof through which the viscous oils are to be transmitted, the number of pumping substations interposed in said pipe, as well as the rate at which the oils are transported therethrough. This low viscosity hydrocarbon buffer must preferably be of such volume that it will take up all of the viscous oils which will become intermixed therewith during the transport thereof through the pipeline, and will at the same time prevent, or at least substantially and materially inhibit the intermixing of the two relatively more viscous crude oils being transported with said light hydrocarbon as a buffer thereinbetween. In general, in a 10-inch or 12-inch pipeline of about 100 miles it has been found that the use as a buffer of between about 100 and about 300 barrels of a light hydrocarbon having a viscosity of kerosene will adequately protect or prevent the intermixing of two viscous crude oils being transported through this pipeline with this light hydrocarbon as a buffer thereinbetween. However, it must be understood that, depending on the above and other conditions, the volume of the buffer (e.g. light hydrocarbon fraction) may be as low as a few barrels or may have to be as high as a thousands barrels or even greater.

As a non-limiting example of a situation where the process of the present invention is of great importance, reference may be made to the transport from an oil field to a refinery of two relatively viscous crude oils, both of which have fairly similar viscosities and densities, but one of which has a considerably higher wax content than the other. These two crude oils have a viscosity of about 150–190 centipoises at 122° F., but differ from each other in that one of these crudes has a very low wax content and is highly suitable for the production of lubricating oils therefrom, while the second crude has a high wax content and while it is unsuitable for lube oil production, is used for cracking operations to produce motor fuels, and the like. The low wax crude oil, termed hereinafter "lube crude" is considerably more valuable than the second-mentioned "high wax" crude because of the ease with which one can manufacture lubricating oils therefrom. Also, it must be noted that the intermixing of the "high wax" crude in amounts as low as 2% with the "lube crude" materially depreciates the value of the latter because the lubricating oils made from such blend have considerably high cloud points.

When a 125,000 barrel tender of the heavy viscous crude with the high wax content was transported through a 10-inch or 12-inch pipeline of about 100 miles in length, followed by a like tender of the above-mentioned lube crude (having the relatively low wax content), the intermixing at the interface between these two crude oils was such that approximately 4000 barrels of the lube crude oil had to be considered as wash oil, i.e. oil which was blended with the high-wax oil. Remembering that each tender has two interfaces and that there are a number of such tenders pumped per month, the loss caused by the above 100-mile transport operation (due to degradation of lube crude) amounted to more than 16,000 barrels per month.

The use of a radioactive tracer, such as described in Metcalf—U.S. 2,631,242, and Mithoff et al.—U.S. 2,706,254, will lower the amount of lube crude oil which is allowed to go to the high-wax heavy viscous crude oil tanks, this because the presence and quantity of the radioactive isotopes (introduced in minute quantities at the interface) can be detected at the end of the line so that the operator can obtain an instantaneous and precise determination of the position and characteristics of the critical region, i.e. of the region where the two tenders abut and are to a greater or lesser degree intermixed with each other. However, even such operations obviously do not eliminate the losses of the crude having the higher economic value, and, in fact, in the above-described case, the losses in the 100-mile line were still in the neighborhood of 10,000 barrels of the "lube crude" per month.

On the other hand, when the above-mentioned crude oils are transported in laminar flow through the same line and in the same sequential order, except that a slug of about 300 barrels of a light, refined hydrocarbon having an API gravity of about 36° and a viscosity of about 3.0 centistokes at 120° F. is introduced as a buffer into the pipeline before and after each viscous crude tender, there was substantially no intermixing of the crudes; all of the intermixing was between the particular crude oil and the light hydrocarbon oil. Most of the intermixing was found to be between the tailings of the viscous oil tender and the buffer, there being materially less mixing between the buffer and the viscous oil following such buffer slug. It must be noted that the light hydrocarbon buffer, under the operating conditions in the line, flows in a truly turbulent state.

The use of the light hydrocarbon buffer, not only prevents the degradation of the relatively more valuable viscous crude oil thus being transported, but also permits the recovery of the crude oils therefrom by various refinery treatments; this is due to the difference in volatility and other characteristics between the buffer fraction and the viscous crudes being transported in juxtaposition thereto.

In some cases the process of the present invention may be modified by the use therewith of the radioactive isotope technique mentioned above. Thus, the addition of about 10 millicuries of, for example, radioantimony ($Sb^{124}$ having a 60-day half-life) into the light buffer fraction readily permits a positive identification of the passage of the oils through the pipe. For this purpose, one may also use the process of this invention together with the process described and claimed in the above Mithoff patent—U.S. 2,706,254. By providing a Geiger counter, or a similar device sensitive to gamma radiations, on the outside of the pipe, the approach and passage of the aforementioned slug (containing the radioactive material) will be indicated by a gradual increase in the activity recorded, followed by a substantially sudden drop. This is due to the intermixing of the tailings of the first crude with the front end of the slug, the amount of intermixing between the slug and the front end of the second crude being very small due to the cone or bullet shape of the head end of such second crude oil moving through the pipe.

Instead of using antimony-124, other radioactive materials may also be used. The following are non-limiting illustrative examples of the radioactive isotope materials which may be used as tracers: cobalt-60, iodine-131, zirconium-95, and zinc-65. The amounts thereof to be used may vary from fractions of a millicurie to several millicuries, e.g. 10 or more, depending on the distance travelled, pipe diameter, type of flow, isotope radiation, and detector sensitivity.

Instead of using radioactive isotopes to identify the time of passage of an oil through the pipe, it is obviously possible to use other means or methods therefor. Thus, the periodic determination of gravity will permit identification of the fluids passing a given point in the pipe. Also, continuous or periodic determination of the fluid temperatures may be used for the same purpose, it being noted that the laminar flow of viscous fluids will form an insulating film on the interior walls of the pipe so that the temperature of the latter will be different from the temperatures obtained when a fluid is flowing therethrough in a turbulent state.

I claim as my invention:

1. A process of transporting two different, relatively viscous oils through a pipeline which comprises introducing the first of said viscous oils into the pipeline and conveying it through said pipeline at such a rate that its flow therethrough is substantially laminar, introducing and conveying through said pipeline behind said first viscous oil a volume of an oil of a relatively low viscosity such that under the transport conditions in the pipeline said low viscosity oil is flowing therethrough in a truly turbulent state, and introducing the second of said viscous oils into the same line and conveying it therethrough behind said low viscosity oil under substantially laminar flow conditions.

2. A process of transporting two different, relatively viscous hydrocarbon oils through a pipeline which comprises introducing the first of said viscous hydrocarbon oils into the pipeline and conveying it through said pipeline at such a rate that its flow therethrough is substantially laminar, introducing and conveying through said pipeline behind said first viscous hydrocarbon oil a volume or a hydrocarbon oil of a relatively low viscosity such that under the transport conditions in the pipeline said low viscosity oil is flowing through in a truly turbulent state, and introducing the second of said viscous hydrocarbon oils to the same line and conveying it therethrough behind said low viscosity oil under substantially laminar flow conditions.

3. The process according to claim 2, wherein the Reynolds numbers of the viscous hydrocarbon oils flowing through the pipeline are between about 800 and about 2000.

4. The process according to claim 2, wherein the Reynolds numbers of the viscous hydrocarbon oils flowing through the pipeline are between about 800 and about 2000, and wherein the Reynolds number of the relatively low viscosity oil is above about 10,000.

5. In a process for transporting two different, relatively viscous crude oils through a pipeline, the improvement which comprises introducing and conveying the first of said crude oils into and through a pipeline under such flow conditions that the Reynolds number of said crude oil is between about 800 and about 2000, introducing and conveying through said pipeline behind said first crude oil a volume of a relatively low viscosity oil, said oil being in contact with the rear face of said first viscous crude oil and having a viscosity such that under the transporting conditions it has a Reynolds number of at least 10,000, and introducing and conveying behind said low viscosity oil the second of said crude oils through the same pipeline under such flow conditions that the Reynolds number of said second crude oil is between about 800 and about 2000, said second crude oil being in contact with the rear face of the low viscosity oil.

6. The process according to claim 5, wherein the relatively low viscosity oil has a viscosity of between about 1 and about 3 centistokes at 120° F.

7. The process according to claim 5, wherein the relatively low viscosity oil is a kerosene, and wherein the amount thereof introduced into the pipeline between the two crude oil tenders contiguous therewith is such that no intermixing between said crude oils will occur.

8. The process according to claim 5, wherein a radioactive isotope is added to the low viscosity oil to permit accurate identification of the position of said oil at any time in the pipeline.

References Cited in the file of this patent

UNITED STATES PATENTS

| | | |
|---|---|---|
| 2,694,404 | Luft | Nov. 16, 1954 |
| 2,706,254 | Mithoff | Apr. 12, 1955 |

OTHER REFERENCES

The Petroleum Dictionary by Boone, University of Oklahoma Press, Copyright 1952, page 276. (Copy in Scientific Library.)